Oct. 11, 1949.　　　　R. J. SHARP　　　　2,484,054
COFFEE MAKING DEVICE
Filed Aug. 1, 1945　　　　3 Sheets-Sheet 1
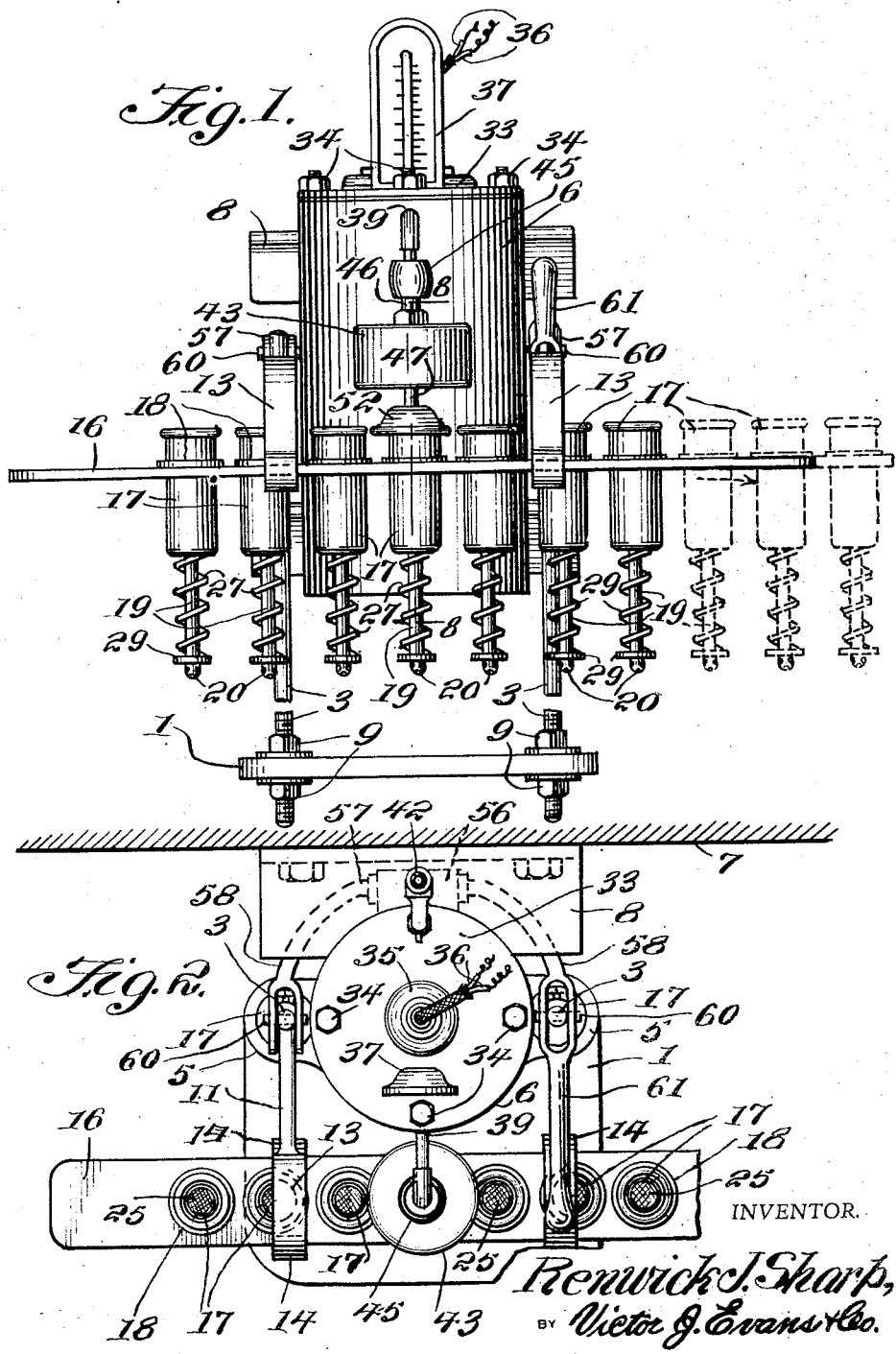
INVENTOR.
Renwick J. Sharp,
BY Victor J. Evans & Co.
ATTORNEYS

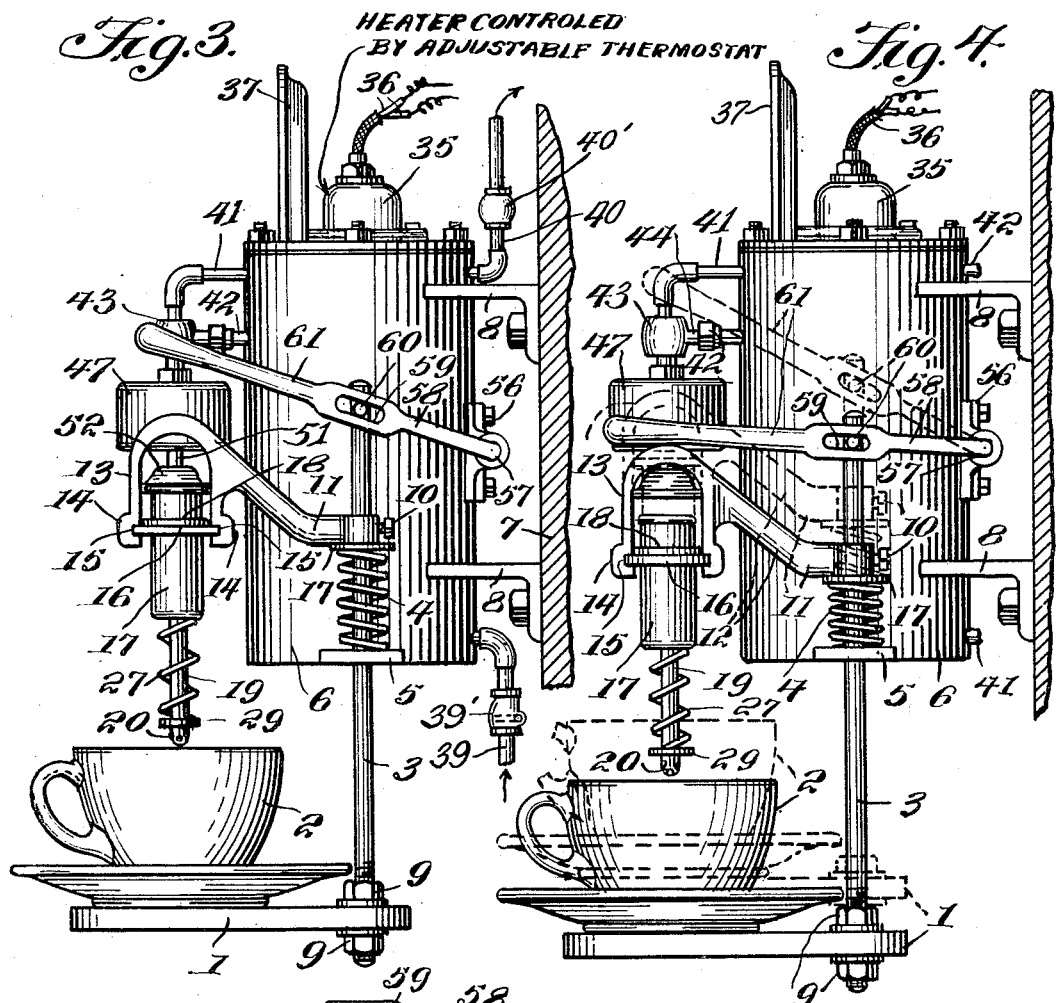
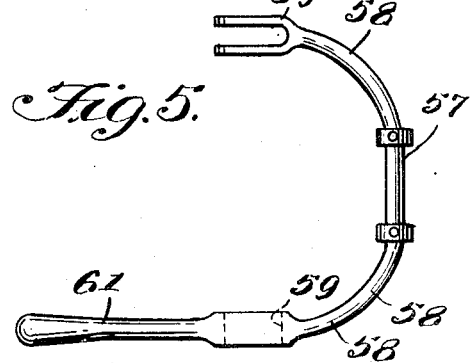
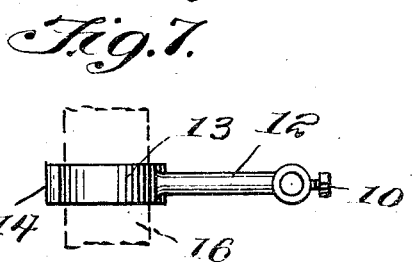

Oct. 11, 1949.   R. J. SHARP   2,484,054
COFFEE MAKING DEVICE
Filed Aug. 1, 1945   3 Sheets-Sheet 3
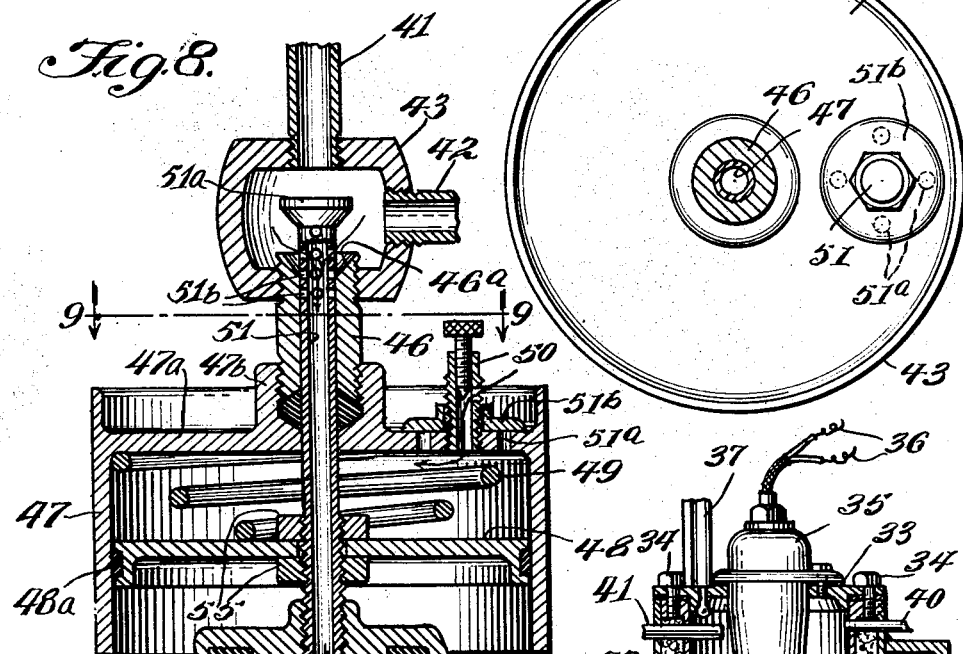
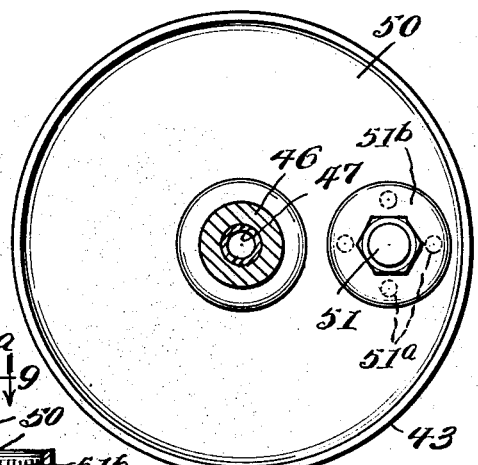
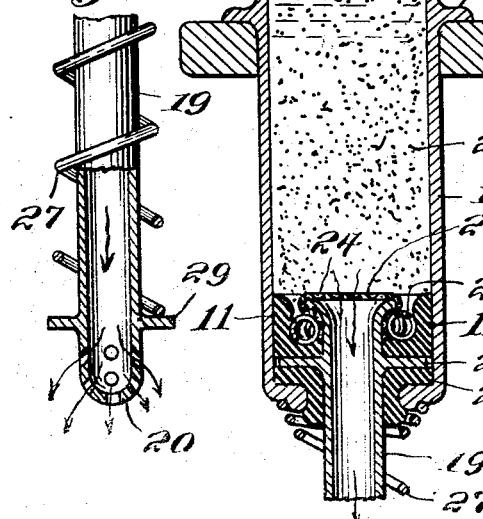
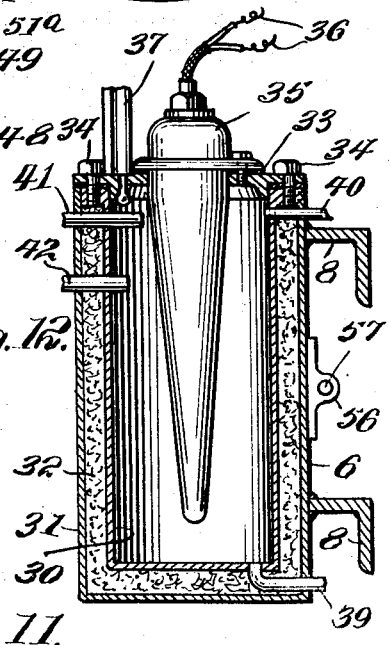
INVENTOR.
Renwick J. Sharp,
BY Victor J. Evans & Co.
ATTORNEYS Patented Oct. 11, 1949

2,484,054

UNITED STATES PATENT OFFICE 2,484,054

COFFEE-MAKING DEVICE

Renwick J. Sharp, Guatemala, Guatemala

Application August 1, 1945, Serial No. 608,220

3 Claims. (Cl. 99—283)

This invention appertains to improvements in beverage making devices, and has for an object to provide one of a practical, sturdy, and efficient construction, for making beverages, particularly coffee; the same being of a design which allows for the simultaneous brewing and dispensing of individual servings, in an economical, rapid, and sanitary manner; so that the beverage may be partaken of while in full aroma and flavor, without a leftover surplus to become stale, or be wasted.

Generally, my device utilizes water at city pressure and, by the use of an electrical, thermostatically controlled, heating element, associated with a supply tank having connection with a city main, the water within the tank is heated to a temperature above the boiling point and circulates from and to the same through a distributing chamber from which a proper amount is to be subsequently discharged through sufficient ground coffee to make one cup, the discharge of the water being effected gradually in order that all of the desirable components are extracted and the completed beverage is delivered directly into a cup.

With the foregoing and other objects and advantages of equal importance in view, the invention resides in the certain new and useful combination, construction, and arrangement of parts, as will be hereinafter more fully described, set forth in the appended claims, and illustrated in the accompanying drawings, wherein:

Figure 1 is a front elevation of a preferred embodiment of the device, in accordance with the invention, and showing the manner of shifting the supporting rack for successively positioning a number of the tubular coffee making receptacles relatively to the hot water dispensing head;

Figure 2 is a top plan view;

Figure 3 is a side elevation, showing the elevated position of the rack to engage the upper open end of the positioned receptacle with the closure cap carried at the lower end of the hot water discharge tube, the control hand-lever being in its intermediate position of operation;

Figure 4 is a view similar to that of Figure 3, but showing the control hand-lever in its two other operative positions, in full lines at its lowermost position to allow for the shifting of the receptacle supporting rack relatively to the dispensing head, and in broken lines at its uppermost position to cause the establishment of communication between the distributing chamber and the discharge tube;

Figure 5 is a top plan view of the control hand-lever per se;

Figure 6 is an elevational view of the control hand-lever;

Figure 7 is a top plan view of one of the supporting arms for the receptacle supporting rack;

Figure 8 is an enlarged, vertical section, taken through the line 8—8 on Figure 1, looking in the direction of the arrows;

Figure 9 is a horizontal section, taken through the line 9—9 on Figure 8, looking in the direction of the arrows;

Figure 10 is a fragmentary, elevational view, partly in section, showing the lower end portion of the beverage delivery tube;

Figure 11 is a horizontal section, taken through the upper end portion of the beverage delivery tube, and showing the spring clamp for securing the filter element in place thereon; and, Figure 12 is a vertical section, taken through the hot water tank, and showing the manner of installation of the electrical heating element in the removable cover of the tank.

Referring to the drawings, wherein like characters of reference denote corresponding parts in the several views, the invention, as it is exemplified therein, is comprised in a hot water tank 6, which is bracketed, as at 8, from a vertical support, such as a wall 7. Positioned beneath and projecting beyond the front side of the tank 6, is a platform or shelf 1, to support a number of coffee cups or the like 2; it being supported adjacent its rear edge on the lower ends of a pair of vertical rods 3, which, in turn, are spring sustained, as at 4, from brackets 5, extending laterally from opposite sides of the tank 6, the rods being provided with lock nuts 9, above and below the platform 1, to secure the latter thereon.

Secured on each of the rods 3, immediately above the spring 4, by means of a set screw 10, is a supporting member, in the form of a forwardly and upwardly curving arm 12, which carries an inverted, substantially U-shaped member 13, at its free end, to support an elongated rack member 16, the latter being provided with a set of aligned openings to have a like number of tubular receptacles 17 seated in the same, and the members 13 with grooves 15, extending crosswise of the inner sides of the leg portions thereof, to allow the rack member to be slidably shifted in an endwise direction, for purposes to be presently explained. The receptacles 17 are preferably cylindrical in form and provided with annular flanges 18 exteriorly thereof, to support the same in the openings in the rack 16.

Each of the receptacles 17 is open at its upper and lower ends, the lower end being inwardly flanged, to form a seat for a bushing 22 for the slidable support of a beverage delivery tube or nozzle 19, the upper end of which is outwardly flanged, as at 21, to seat on the bushing, when normally disposed. The upper side of the bushing 11 is formed with an annular recess, encircling the delivery tube 19, to seat a spring element 26 within the same for the purpose of securing a filter element 25, such as a disc of muslin or the like, taut across the flanged end 24, which end, when covered with the filter element, constitutes a piston to eject used coffee grounds from the receptacle, upon its removal from the rack. The delivery tube 19 has its lower end perforated, and above the perforations is exteriorly flanged, as at 29, to support a coil spring 27, encircled about the tube, under tension between the same and the lower end of the receptacle 17, for the purpose of retaining the tube in its normal position.

The hot water tank 6 is preferably cylindrical in form and made with spaced inner and outer walls 30 and 31, to receive a thermal insulation 32 therebetween, substantially as shown in Figure 12. The top of the tank 6 is provided with a removable cover 33, which is secured in place by means of bolts or the like 34, and a central opening through which a heating element 35 depends for the immersion of its lower portion in the water; the upper end portion of the heating element being provided with an annular flange 35' for its support and securement, by means of screws or the like 38. Also, the heating element 35 is provided with a conductor cord 36 for its connection with a suitable current source (not shown) and in circuit with a thermostatic control device 37, mounted on the cover 33 of the tank 6.

A cold water connection 39, from the house service supply, enters the tank 6 adjacent its bottom, and an outlet connection 40 leads therefrom adjacent its top. A second outlet connection 41 leads laterally from the tank 6, adjacent its top end, to supply hot water to the top of a valve chamber 4, while a return connection 42 leads from a side of the latter and enters the tank 6, at a point below the outlet connection 41, substantially as is best shown in Figures 3 and 4.

The valve chamber 43 is supported on a nipple 46, which is screw-threaded into a boss 47b, formed on the top end wall 47a of a cylinder 47; the latter constituting a dispensing head for the hot water, open at its lower end and housing a piston 48 that is normally tensioned in a downward direction by a coil spring 49. The piston 48 has its periphery channeled to receive a ring packing 48a, and the cylinder 47 an adjustable air vent or valve 50, seated in its top wall, to admit air on the downward movement of the piston and to bleed air from above the piston on its upward movement.

The piston 48 is adjustably secured on a tubular element 51, which extends upwardly through the boss 47b and the nipple 46 and into the valve chamber 43. The upper end of the tube 51 is closed by a tapered valve body 51a, which normally seats in a similarly shaped depression 46a, formed in the top end of the nipple 46. Below the valve body 51a, the tube 51 is perforated, as at 51b, for the discharge of hot water downwardly therethrough, whenever the tube is forced upwardly to lift the valve body from its seat 46a.

Screw-threaded on the lower end of the tube 51, below the piston 48, is an inverted dished cap 52, which is adapted to seat on the top end of a receptable 17, when the rack 16 is elevated to that end; a ring packing 53 being carried in an annular channel, formed in the lower side of the cap, to engage the edge of the receptacle opening to provide a substantially water-tight joint therebetween.

Pivoted in a bracket 56, on the rear side of the tank 6, is a substantially U-shaped lever 58, which has its arms extending forwardly at opposite sides of the link 6, the arms being cut away, as at 59, to engage with a cross-pin 60 in the upper end of each of a pair of rods 3. The end of the one of the arms is extended forwardly beyond the cutout 59 and shaped to provide an actuating handle 61.

In the use and operation of the device, as thus constructed and arranged, and with the heating element 35 connected in on the electric current supply and the operative parts normally disposed by having the hand-lever 58 set at its lowermost position as shown in full lines in Figure 4; the receptacles 17 will be loaded with individual makings of ground coffee and seated in the openings in the rack 16 and the latter then shifted in its supports 11 to center the first of the receptacles beneath the closure cap 52, carried at the lower end of the hot water discharge tube 51. A cup 2 will now be placed on the platform 1 and the hand-lever 58 then raised to its intermediate position, during which motion the platform and the rack will be lifted and the upper open end of the first of the receptacles 17 forced into engagement with the closure cap 53. With the water in the tank 6 heated to the temperature setting of the thermostat 37, it will circulate between the tank and the valve chamber 43 through the pipe connections 39 and 40. Now to brew the first serving of coffee, the hand-lever 58 will be raised to its uppermost position, as shown in broken lines in Figure 4. Here, the platform 1 and the rack 16 will again be lifted and cause the first of the receptacles 17 to transmit the lifting motion to and through the closure cap 53 to the hot water discharge tube 51 and the piston 48, the upward movement of the latter acting to compress the coil spring 49 and that of the discharge tube to lift the valve body 51a from its seat 46a. During the upward movement of the piston 48, air will be bled from the cylinder 47 by opening the vent 50 to atmosphere. With the lifting of the valve body 51a, hot water within the valve chamber 43 will pass through the perforations 51b and downwardly through the tube 51 from which it discharges over the ground coffee in the first of the receptacles 17. After passing through the ground coffee, the liquid passes downwardly through the filter element 25 and the delivery tube 19 and into the cup 2. However, immediately following the second raising movement of the hand-lever 58, it is returned to its intermediate position to lower the rack 16 from its normal engagement with the flange 18 of the first of the receptacles 17, so that the latter is gradually lowered with the downward movement of the piston 48 and the discharge tube 51 by the action of the coil spring 49, the expansion effort of which is initiated immediately following the lowering of the rack 16.

The discharge of hot water, in sufficient amount to make the one cup of brew, is regulated by the dominance of the coil spring 49 over the coil springs 4, as well as by the degree of adjustment of the vent 50, during the downward movement of the piston 48, which movement results in the gradual closing of the valve body 51a on its seat. With the initial raising of the hand-lever 58, the coil springs 4, normally held under compression when the hand-lever is set at its lowermost position, expand and exert the desired lift of the platform 1 and the rack 16 and the necessary pressure of the upper open end of the first of the receptacles 17 against the closure cap 52 to prevent leakage therebetween. With the filling of the cup 2, and its removal from the platform 1, the downward movement of the hand-lever 58 from its intermediate position results in the compression of the coil springs 4 and the disengagement of the first of the receptacles 17 from the closure cap 52. By now shifting the rack 16, the several receptacles will be successively brought into position beneath the closure cap, when the operation of brewing is then repeated. As hot water is drawn from the tank 6, the normal pressure of the service water supply will force its way past the check valve 39' and into the tank to replace the amount withdrawn, and, in order to remove used grounds of coffee from a receptacle 17, the receptacle will be removed from the rack 16 and the grounds ejected by a manipulation of the piston 23 constituted in the delivery tube 19 and the filter element 25.

Having thus fully described a practical and preferred embodiment of my device, it is to be understood that the words which I have used are words of description rather than of limitation, and that changes within the purview of the appended claims may be made, without departing from the true scope and spirit of my invention in its broader aspects.

I claim:

1. In a device of the class described, hot water tank connected with a city water supply line, a heating element depending within said tank and connected with a source of electrical current, a valve chamber connected with said tank for the circulation of hot water therethrough, a vertically movable discharge tube depending from within said valve chamber, a valve body closing the upper end of said tube and normally engaged with a seat in the bottom side of said valve chamber about the tube, said tube being perforated immediately below said valve body, a cap carried on the lower end of said discharge tube, a cup supporting platform positioned below said valve chamber, a rack spaced above said platform, a tubular receptacle supported on said rack to receive a measured amount of the beverage making substance, a discharge nozzle depending from within said receptacle, means mounted on said tank for supporting said platform and said rack for vertical movement relative thereto, said means being manually operable to effect the lifting of said platform and said rack to cause the top end of said receptacle to engage with said cap, the pressure of said receptacle on said cap acting to lift said discharge tube for the displacement of said valve body from its seat whereby hot water from within said valve chamber will pass through said perforations and downwardly of the discharge tube and from thence into the receptacle and through the beverage making substance for its subsequent discharge from said nozzle into said cup, and automatic means for causing said valve body to close on its seat during the downflow of hot water through said discharge tube to effect the brewing of the beverage in sufficient amount to fill a cup positioned on said platform beneath said discharge nozzle.

2. The invention as defined in claim 1, with the first named means comprising in a pair of vertically movable rods, one at each side of said tank, guide members for said rods mounted on the lower end of said tank, said platform being supported on the ends of said rods below said guide members, coil springs on said rods and seated on said guide members, arms adjustably secured on said rods at the upper ends of said coil springs, said arms extending forwardly of said tank to support said rack above said platform, and a hand-lever having pin and slot connections with the upper ends of said rods to effect the lifting and lowering of said platform and said rack relatively to said cap, said coil springs acting to tension said arms in an upward direction to forcibly engage the upper end of said receptacle with said cap.

3. The invention as defined in claim 1, with said automatic means comprised in a cylinder positioned below said valve chamber and having said discharge tube extending downwardly through the same, said cylinder being closed at its top end and open at its bottom end, a piston within said cylinder and adjustably secured on said discharge tube, a coil spring within said cylinder above said piston, and an air regulating valve mounted in the top end wall of said cylinder.

RENWICK J. SHARP.

REFERENCES CITED

The following references are of record in the file of this patent:

UNITED STATES PATENTS

| Number | Name | Date |
|---|---|---|
| 2,283,967 | Brown | May 26, 1942 |

FOREIGN PATENTS

| Number | Country | Date |
|---|---|---|
| 18,541 | France | Feb. 16, 1914 |